(12) United States Patent
Iida et al.

(10) Patent No.: US 6,995,881 B2
(45) Date of Patent: Feb. 7, 2006

(54) IMAGE PROCESSING METHOD AND PROGRAM CAPABLE OF REDUCING GRAININESS

(75) Inventors: Yoshiko Iida, Tokyo (JP); Kazuhiro Saito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 784 days.

(21) Appl. No.: 09/901,612

(22) Filed: Jul. 11, 2001

(65) Prior Publication Data

US 2002/0054306 A1 May 9, 2002

(30) Foreign Application Priority Data

Jul. 14, 2000 (JP) .............................. 2000-214191
Jul. 14, 2000 (JP) .............................. 2000-214192

(51) Int. Cl.
*H04N 1/46* (2006.01)
*G06K 15/00* (2006.01)
(52) U.S. Cl. .................... 358/529; 358/1.9; 358/1.18
(58) Field of Classification Search ............ 358/518, 358/1.9, 2.1, 3.23, 517, 529, 530, 540, 515; 382/167

See application file for complete search history.

(56) References Cited

U.S. PATENT DOCUMENTS 5,982,990 A * 11/1999 Gondek .................... 358/1.9

FOREIGN PATENT DOCUMENTS

JP 2000-115556 4/2000

* cited by examiner

*Primary Examiner*—Jerome Grant, II
(74) *Attorney, Agent, or Firm*—Fitzpatrick, Cella, Harper & Scinto

(57) ABSTRACT

To provide an output image of high quality with no graininess produced. An image processing method for controlling a starting point which produces a black component between vertices showing a plurality of chromatic colors and a vertex showing a black in a reproducible color space of a color output apparatus when a look-up table for converting an input color signal into a plurality of color components including a black component is prepared, which controls the starting point producing said black component based on the value of a complementary color component corresponding to a chromatic color which is inconspicuous in the graininess of a black recording material in an output image.

10 Claims, 12 Drawing Sheets

IMAGE PROCESSING METHOD AND PROGRAM CAPABLE OF REDUCING GRAININESS

BACKGROUND OF THE INVENTION

1. Field of the Invention

The present invention relates to a preparation of a look-up table for converting an input color signal into a plurality of color components including a black component.

2. Related Background Art

In order to form a device dependent C (cyan) M (magenta) Y (yellow) K (black) output value from an input R (red) G (green) B (blue) value from an application, it is known that a color printing apparatus is provided with means for converting the input RGB signal value into a device dependent RGB value and a color conversion LUT for converting the device dependent RGB value into the CMYK output value.

The decision of a K ink amount and an under color removal amount in each lattice point of the color conversion LUT have been calculated from a function with the minimum value of each CMY or K ink amount taken as a parameter. It is difficult to prepare a function for adequately controlling the K ink amount and, depending on a under color removal function, a graininess may have been often produced in an output of high lightness with a result that the image quality of an output image has been deteriorated.

Further, in the under color removal function and a method for preparing the color conversion LUT by a masking calculation method and also a method for performing a three dimensional interpolation in a L*a*b* color space from a three dimensional printer model and for searching a desired CMYK ink amount, not only a vast amount of calculation times have been required, but also an irregularity of gradation has been produced in an output result. Furthermore, with these methods, it cannot always be said that an output color space in the color printing apparatus has been reproduced up to a maximum and that sufficient color reproduction has been maintained for the RGB signal color space which is the input signal.

When the maximum density of the K ink itself is thin, in case of placing the maximum output value of the K ink only on a process black, an output density by a combination of three ink systems to be complementary colors for the adjacent chromatic color color ink, the K ink and the chromatic color color ink is higher than the process ink, and this often gives a rise to the problem and the like that a distortion is produced in the output color space for the color printing apparatus and that a quasi contour is produced in the output image.

SUMMARY OF THE INVENTION

It is a first object of the present invention to make it possible to obtain an output image of high quality which does not produce a graininess.

A first aspect of the present invention is an image processing method for controlling a starting point for producing the black component between vertices showing a plurality of chromatic colors and a vertex showing a black in reproducible color space of a color output apparatus when a look-up table for converting an input signal into a plurality of color components including a black component is prepared, wherein the starting point for producing the above described black component is controlled based on a complementary color component corresponding to the chromatic color in which the graininess of a black recording material is inconspicuous in the output image.

It is a second object of the present invention to make it possible to obtain an output image having a good gradation reproducibility and high quality.

A second aspect of the present invention is the image processing method for preparing the look-up table for converting the input color signal into the output color signal constituted by a plurality of color components which are used when the color output apparatus outputs a color image, which is a method for setting up a lattice point between the vertex showing the chromatic color and the vertex showing the black in the reproducible color space of the above described color output apparatus, wherein a space between the vertex showing the above described chromatic color and the vertex showing the black is divided into a plurality of areas different in the combination of the color component used in the above described color reproduction, and the lattice point is set up according to a ratio of the above described each area between the vertex showing the chromatic color and the vertex showing the black.

Other objects and features of the present invention will be apparent from the following description and accompanying drawings.

DETAILED DESCRIPTION OF PREFERRED EMBODIMENTS

First Embodiment

In a color printing apparatus with an input signal taken as a RGB three primary color signal and an output ink as CMYK, a preparation method of a color conversion LUT (look-up table) for converting a RGB signal into a CMYK signal will be described.

Figure 1:
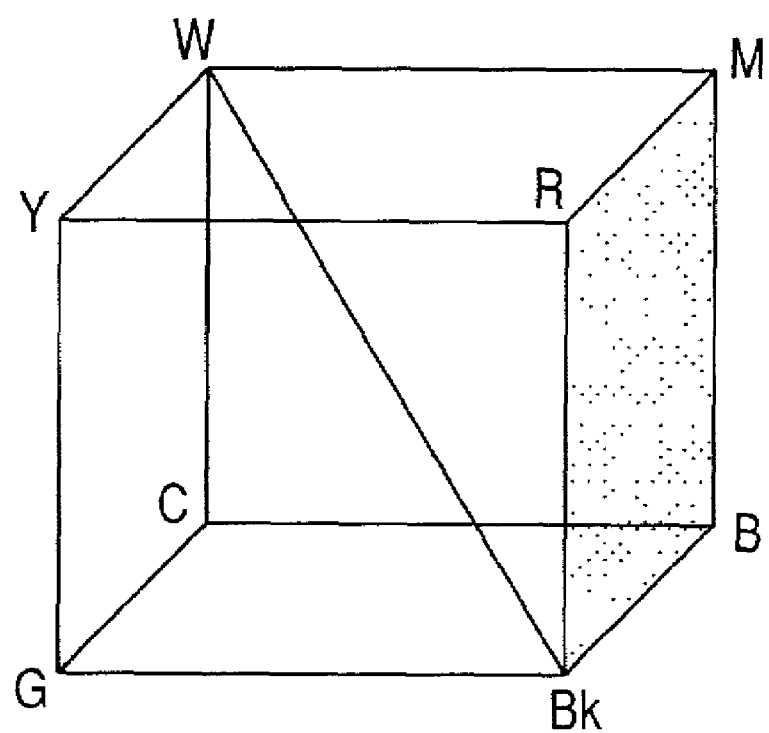
FIG. 1 is a diagram showing a relationship between look-up table lattice points for reproducing an output color space and a color space of a color printing apparatus.

In the present embodiment, an output color space of a color printing apparatus is assumed as shown in FIG. 1 and the color conversion LUT is taken as having each output color corresponding to an input RGB signal value. The input RGB signal is constituted by 8 bits data for each color (0 to 255) and the color conversion LUT is taken as having 16 lattice point intervals and 17 lattice point numbers.

The preparation of the color conversion LUT will be performed by the following procedure.

First, a LUT lattice point, W (paper white), RGBCMY and a processing black BK in the vertex of a reproducible color space of the color printing apparatus are decided, and an output constitutional ink color in each lattice point is decided.

Next, a constitutional ink color of each LUT lattice point in a W (paper white)-RGBCMY and a RGBCMY-Bk lines is decided.

From the above two procedures, the most outer contour of the reproducible output color space of the color printing apparatus is decided.

The constitutional ink color in each LUT lattice point column in the W (paper white)-BK line is decided.

By using the constitutional ink color of an arbitrary LUT lattice point column in the most outer contour and the constitutional ink color of the lattice point column in the W (paper white)-Bk line, an interpolation processing is performed, so that an output of the arbitrary LUT internal lattice point is decided.

In the present embodiment, the K ink amount and the under color removal amount is controlled, so that the following effects can be obtained.

(1) Graininess is not produced in high lightness area.
(2) Color reproducible range of the color printing apparatus is utilized as much as possible.
(3) Continuity of a black gradation is maintained.

A method for preparing a lattice point data of the color conversion LUT by controlling the K ink amount and the under color removal amount, that is, a method for deciding the constitutional ink color of each LUT lattice point in the RGBCMY-BK line will be described below. Particularly, it is important to decide the constitutional ink in the lattice point on the line which links R, G, B, C, M, Y and K.

Figure 2:
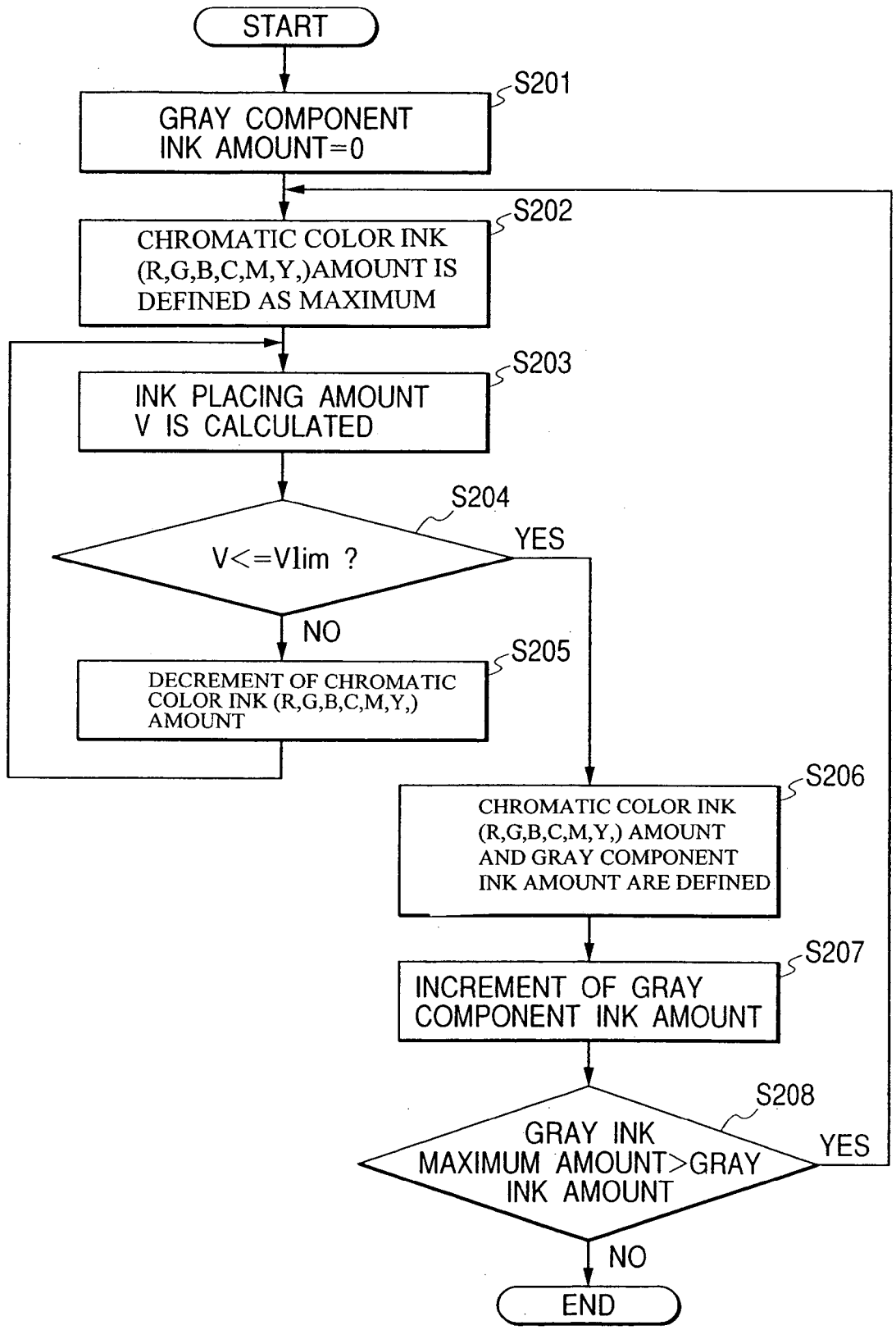
FIG. 2 is a flowchart illustrating a first processing.
Figure 3:
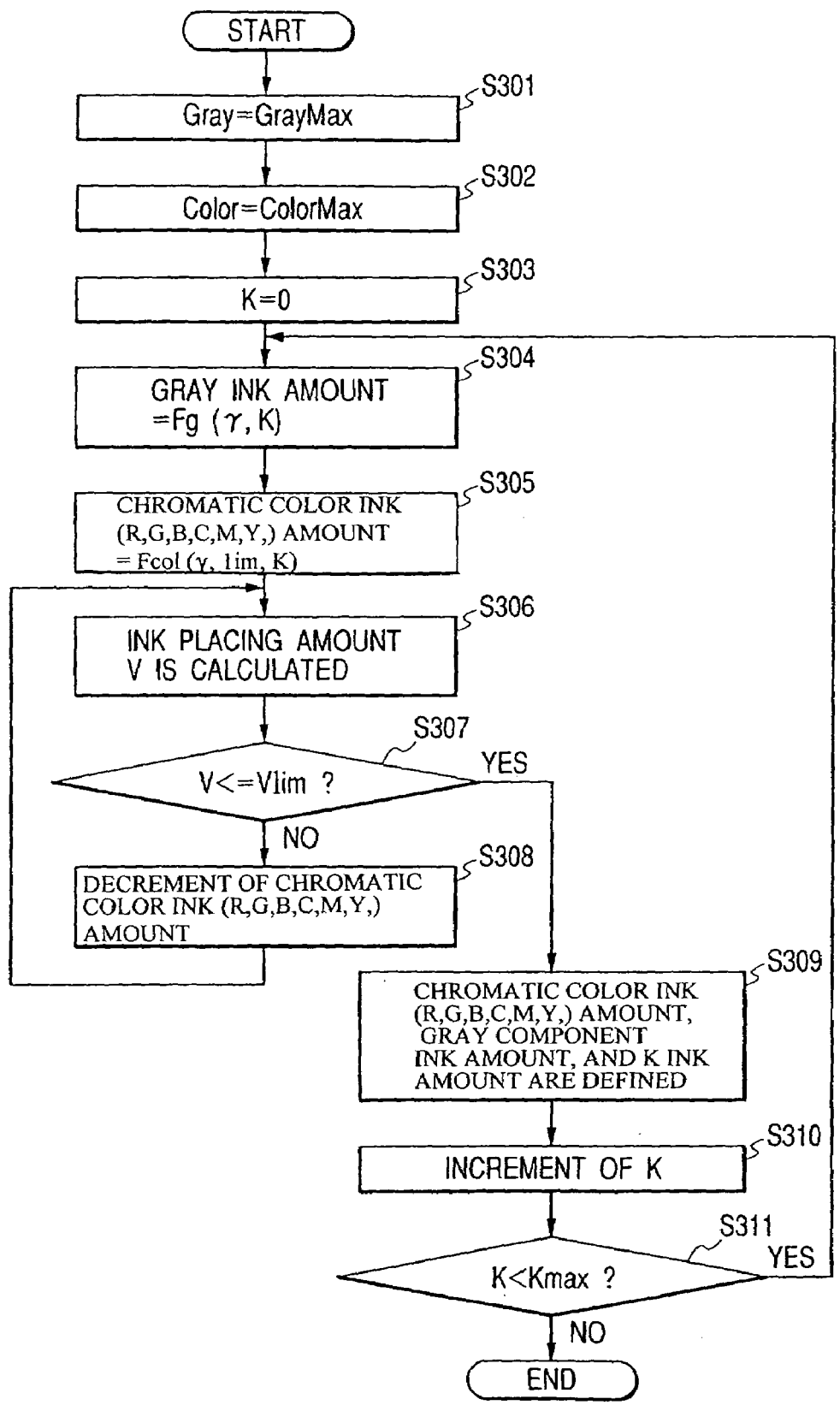
FIG. 3 is a flowchart illustrating a second processing.
Figure 4:
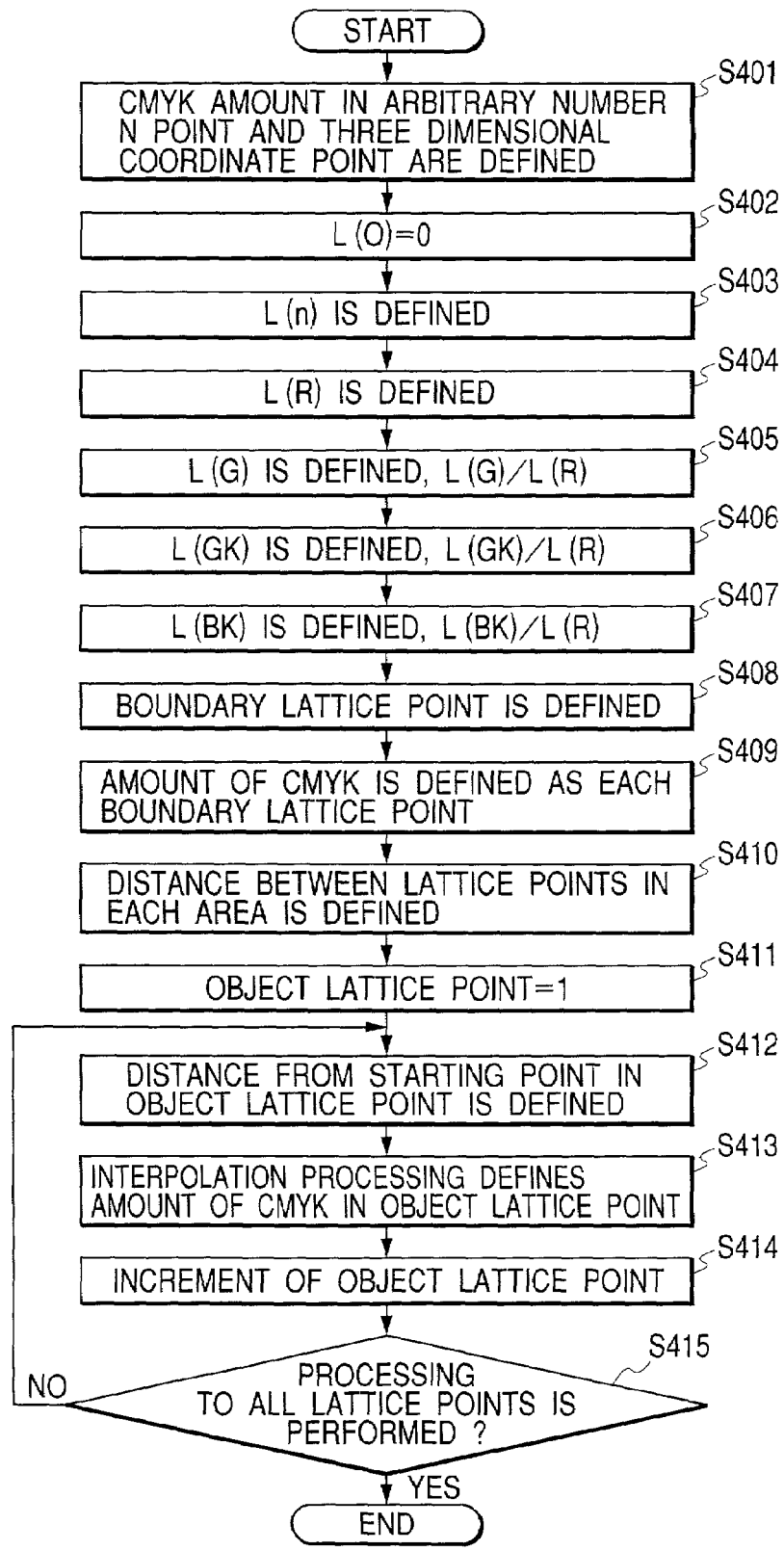
FIG. 4 is a flowchart illustrating a third processing.

As a representative example, the decision of the constitutional ink in the output LUT lattice point column from R (red) to BK (process black) will be described below with reference to the flowcharts as shown in FIG. 2, FIG. 3, and FIG. 4. Note that the decision of the constitutional ink amount from other respective colors of G, B, C, M, and Y to the process black can be decided in the similar procedure.

A group of lattice points on a chromatic color-nonchromatic color line linking R (red) and Bk (process black) as shown in FIG. 1 is defined as a processing object lattice point column.

Based on the constitution of each light ink of the CMYK, a R-Bk line is divided into the area (the Area 0, FIG. 5) defined by a chromatic color ink and a complementary color ink amount (the K ink amount=0), the area (the Area 1) defined by the chromatic color ink and the complementary color ink amount and the K ink amount and the area (the Area 2) defined by the chromatic color ink and the K ink (the complementary color ink amount=0).

First Processing

The CMYK ink amount deciding method in the area (the Area 0) defined by the chromatic color ink and the complementary color ink amount will be described with reference to FIG. 2. In the first processing, the K ink amount is decided so that the graininess in the output image attributable to the K ink dot is controlled.

First, attention is given to the graininess attributable to the K ink dot in an input start of the K ink, and the maximum complementary ink amount (the maximum amount of a gray component ink) in each chromatic color ink of the CMYRGB to be visually indistinguishable in this graininess is defined in advance. Further, a CMYK total ink placing amount limit condition Vlim is defined in advance, and the maximum value of the chromatic color ink amount which satisfies the total ink placing amount limit condition is defined. The maximum value of the chromatic color ink amount is equivalent to a vertex color in the LUT.

In the above described lines, the complementary color ink amount is smaller than the chromatic color ink amount. Therefore, the complementary color ink amount indicates a gray component. Therefore, in the present embodiment, the complementary color ink amount is also referred to as a gray component ink amount.

Here, a cyan ink amount (a gray ink amount) which is equivalent to the complementary color ink of a chromatic color R ink is taken as Cg. The chromatic color R ink is constituted by a Y ink and a M ink.

In step 201, the cyan ink amount Cg is defined as 0.

In step 202, the chromatic color R ink amount Rg is defined as the maximum value Rm of the chromatic color R ink amount.

In step 203, the cyan ink amount Cg and an ink placing amount V in the chromatic color R ink amount Rg are calculated. Here, since the chromatic color R ink is constituted by the Y ink and the M ink, in step 203, the ink placing amount V is calculated by adding the cyan ink amount Cg, the Y ink amount and the M ink amount which constitute the chromatic color ink amount Rg.

In step 204, the ink placing amount V calculated by step 203 is compared with the CMYK total ink placing amount limit condition Vlim in the color printing apparatus and it is determined whether the ink placing amount V is equal to or less than the ink placing amount limit condition Vlim.

When the ink placing amount V is equal to or less than the ink placing amount limit condition Vlim, in step 206, an ink combination of the chromatic color R ink amount Rg and the cyan ink amount Cg is maintained.

In step 207, the cyan ink amount Cg is incremented.

In step 208, until it is determined that the cyan ink amount Cg becomes the above defined maximum complementary color ink amount Cm, the processing subsequent to step 202 is repeated.

In step 204, when the ink placing amount V is equal to or larger than the ink placing amount limit condition Vlim, in step 205, the chromatic color R ink amount is decremented. By using the chromatic color R ink amount Rg reduced by decrement, the processing subsequent to step 203 is performed.

Figure 5:
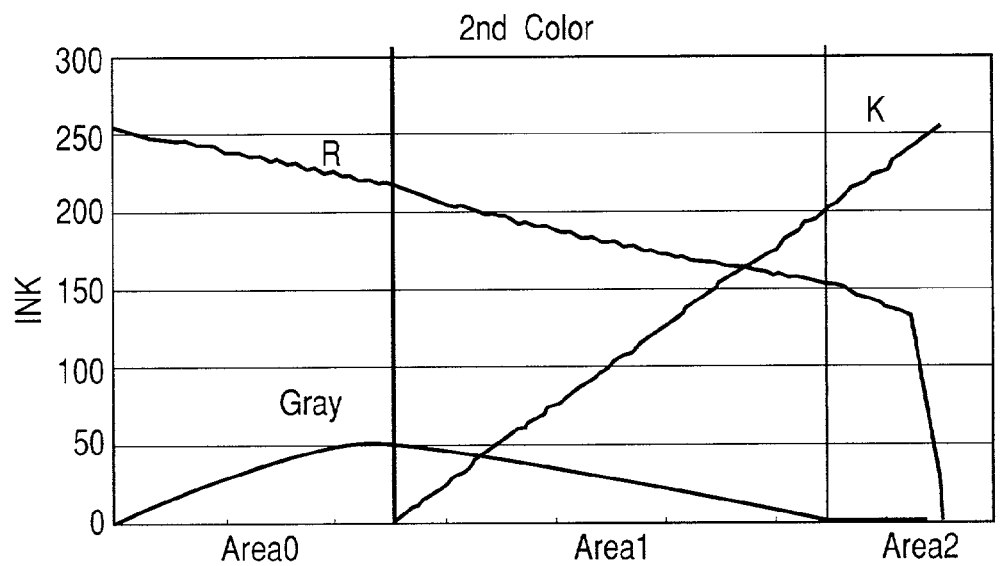
FIG. 5 is a diagram illustrating resultant examples of the first and the second processing.

When the ink combination maintained in step 206 is plotted in order, it becomes like the Area 0 in the graph as shown in FIG. 5

Second Processing

Next, the CMYK ink deciding method, which is performed as the second processing, in the area defined by the chromatic color ink, the complementary color ink and the K ink and the area defined by the chromatic color ink and the K ink (the complementary color ink amount=0) will be described with reference to FIG. 3.

In step 301, a complementary color cyan ink amount is defined as Ck=Cglim. This is intended for not causing a discontinuity in the boundary with the Area 0.

In step 302, the chromatic color R ink amount Rk is defined as the maximum value Rm of the chromatic color R ink amount.

In step 303, the K ink amount is defined as k=0.

Subsequently, the K ink is linearly increased to the K ink amount maximum value (γ=1).

On the other hand, the chromatic color R ink amount Rk is defined by the maximum value Rm of the chromatic color R ink amount and an equation (3.1) having a γr parameter.

$$Rk=Rm \cdot (1-(K/255)\gamma r) \qquad (3.1)$$

While the complementary cyan ink amount Ck is, similar to the chromatic color R ink amount Rk, also defined by the maximum value Cglim of the complementary color cyan ink amount and γc parameter, a zero value (an end) in the complementary color ink for the value of the K ink is defined by an arbitrary parameter limit. Therefore, the complementary color cyan ink amount Ck is defined by an equation (3.2).

$$Ck=Cglim \cdot (1-Fcol(K, \gamma c, \text{limit})) \qquad (3.2)$$

In step 304, the cyan ink amount Ck is defined by using the K ink amount K by the above described equation (3.2).

In a stop 305, the chromatic color R ink amount Rk is defined by the above described equation (3.1).

In step 306, the ink placing amount V is calculated in the K ink amount K, the cyan ink amount Ck calculated by step 304 and the chromatic color R ink amount Rk calculated by step 305.

In step 307, the ink placing amount V calculated by step 306 is compared with the CMYK total ink placing limit condition Vlim in the color printing apparatus and it is determined whether the ink placing amount V is equal to or less than the CMYK total ink placing amount limit condition Vlim.

When the ink placing amount V is equal to or less than the CMYK total ink placing limit condition Vlim, in step 309, the ink combination of the K ink amount K, the cyan ink amount Ck and the chromatic color R ink amount Rk is maintained.

In step 310, the K ink amount K is incremented.

In step 311, until it is determined that the K ink amount K becomes the maximum ink amount, the processing subsequent to step 304 is repeated.

In step 307, when the ink placing amount V is equal to or larger than the CMYK total ink placing amount limit condition Vlim, in step 308, the chromatic color R ink amount Rk is reduced until it satisfies the condition.

The resultant examples in the flowchart processing as shown in FIG. 3 become like the Area 1, the Area 2 of the graph as shown in FIG. 5.

As shown in the Area 2, since the chromatic color ink amount is gradually reduced to the last and the K ink amount is increased, the continuity of a black gradation can be maintained.

From each ink amount of the CMYK calculated by the flowchart processing of the foregoing FIG. 2, FIG. 3, the ink combination of the ink of the arbitrary point number is selected and a batch by the ink combination selected by the color printing apparatus is outputted and color-measured.

Figure 7:
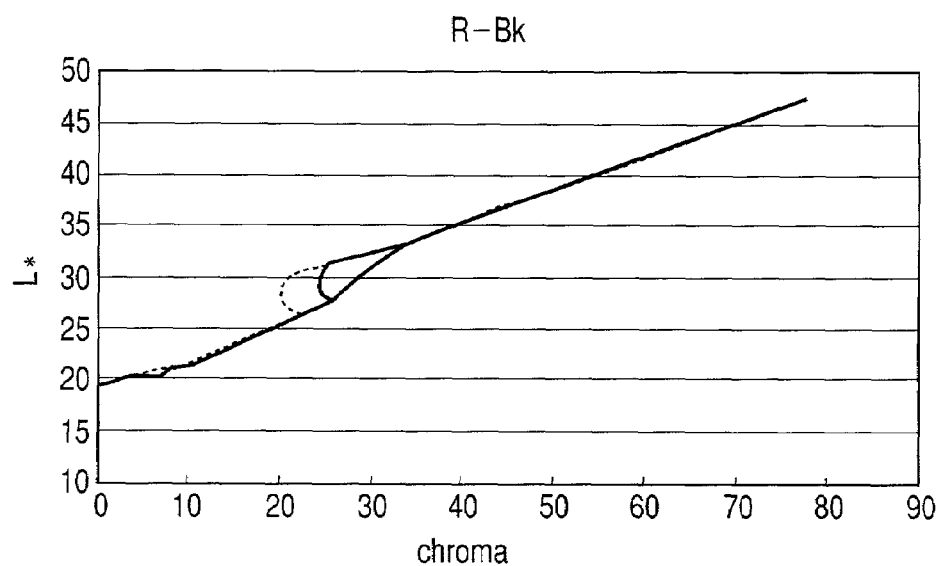
FIG. 7 is a diagram illustrating a comparison result of a reproduction color space in a color printing apparatus which is shown by the axis of the ordinates L*, the axis of abscissas chroma (chromaticness) when a parameter for calculating a complementary color ink and a chromatic color ink is changed in the present embodiment.
Figure 8:
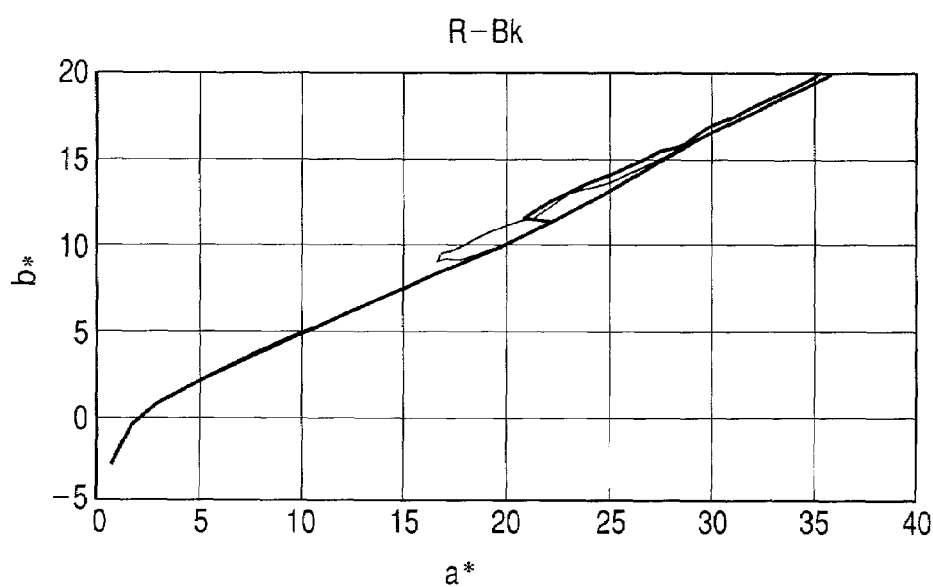
FIG. 8 is a diagram illustrating the comparison result of the reproduction color space in the color printing apparatus which is shown by the axis of the ordinates b*, the axis of abscissas a* when the parameter for finding the complementary color ink and the chromatic color ink is changed in the present embodiment.

The resultant examples are shown in FIG. 7, FIG. 8.

In FIG. 7, FIG. 8, regarding the cyan ink amount Ck defined by the equation (3.2) and the chromatic color R ink amount Rk defined by the above described equation (3.2), the result of the change made in three types for each parameter in the equation (3.1), the equation (3.2) is shown.

As evident from FIG. 7, FIG. 8, regarding the area defined by the chromatic color ink and the complementary color ink amount (K=0), the area defined by the chromatic color ink and the complementary color ink amount and the K ink and the area defined by the chromatic color ink and the K ink (the complementary color ink amount=0), the reproduction color space is the maximum and each parameter in the equation (3.1) and the equation (3.2) for smoothly linking each area can be concentratedly decided.

In this way, each parameter in the equation (3.1) and the equation (3.2) for smoothly linking area defined by the chromatic color ink and the complementary color ink amount, the area defined by the chromatic color ink and the complementary color ink amount and the K ink and the area defined by the chromatic color ink and the K ink (the complementary color ink amount=0), where the reproducible color space is the maximum and gradation is high, is decided.

Third Processing

Based on each ink of the CMYK in each decided parameter, the batch printed by the ink combination of the selected arbitrary point number is formed, and the batch is color-measured, and a three dimensional coordinate value is calculated in the interior of the color reproduction space.

The processing for defining the CMYK ink amount on the LUT lattice point will be described with reference to the flowchart as shown in FIG. 4.

In step 401, each ink amount of the CMYK of arbitrary number N points on R-Bk and each three dimensional coordinate in the interior of the color reproduction space are defined. On this occasion, a boundary point of each area of Area 0, Area 1 and Area 2 as shown in FIG. 5 is included in the arbitrary number N points.

In step 402, a Bk point is taken as a starting point 0 and a three dimensional distance is defined as L(0)=0.

In step 403, a three dimensional distance of a point n from an adjacent point (n−1) is calculated. When the three dimensional space is a Lab space, it is calculated by the following equation:

$$L(n)=\sqrt{(L^*(n)-L^*(n-1))^2+(a^*(n)-a^*(n-1))^2+(b^*(n)-b^*(n-1))^2}$$

In step 404, the Bk point is taken as the starting point and a distance L(R) to R is calculated as a total sum of the three dimensional distances between each point calculated in step 403.

$$L(R)=\Sigma L(n) \ (n=0 \ldots N)$$

In step 405, a distance L(G) of the area (the Area 0) defined by the chromatic color ink and the complementary ink amount is calculated and a ratio for the distance L(R) is calculated.

In step 406, a distance L(GK) of the area (the Area 1) defined by the chromatic color ink and the complementary ink amount and the K ink is calculated, and a ratio for the distance L(R) is calculated.

In step 407, a distance L(BK) of the area (the Area 2) defined by the chromatic color ink and the K ink (the complementary color ink amount=0) is calculated, and a ratio for the distance L(R) is calculated.

In step 408, according to a ratio of the distances between each area and the distance L(R), the lattice point number between each area in the R-Bk lattice point column of the color conversion LUT is distributed and a boundary lattice point is defined.

In step 409, for the LUT lattice point which becomes a boundary of each area, the CMYK ink amount which becomes the boundary of each area is defined.

In step 410, the distance defined as each area is equally divided by the number of lattice point intervals, and the distance between the LUT lattice points in each area is calculated.

In step 411, in the R-Bk lattice point column, with the BK as the starting point, an object LUT lattice point is defined as a lattice point which is shifted to the R side by one lattice point from a BkLUT lattice point.

In step 412, the distance between lattice points from the starting point Bk in the object LUT lattice point is calculated from the distance between the LUT lattice points in each area calculated in step 410.

In step 413, from the combination of the CMYK ink defined in step 401 and each distance from the starting point Bk, which holds in-between the distance between the lattice points from the starting point Bk in the defined object LUT lattice point, the CMYK ink amount in the object LUT lattice point is calculated by a linear interpolation processing based on the distance.

In step 414, the object lattice point is shifted to the R side by one lattice point.

In step 415, in all the lattice points in the R Bk lattice point column, until each ink amount of the CMYK is defined, the processing of step 412 to step 415 is repeated.

Figure 6:
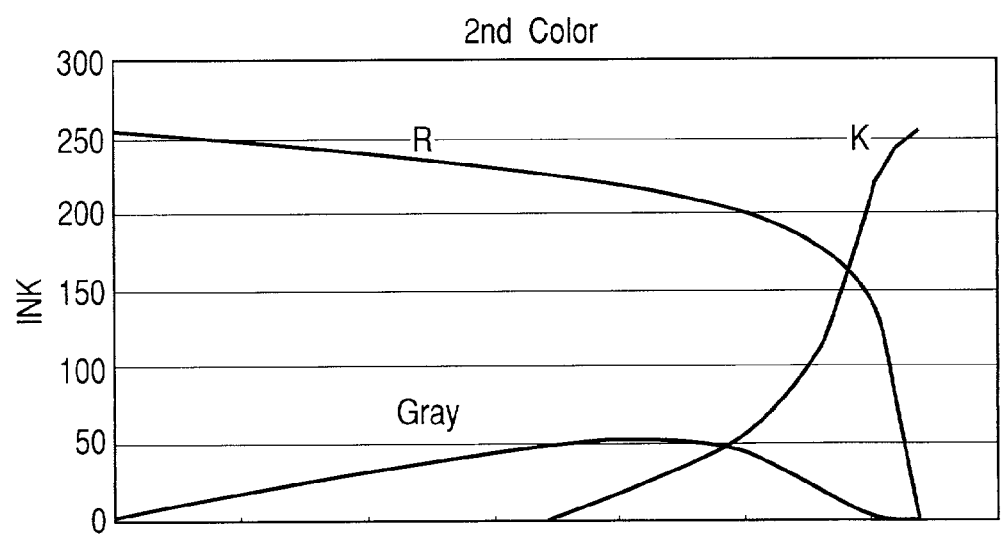
FIG. 6 is a diagram illustrating the resultant example of the third processing.

One example of the results of the above described processing is shown in FIG. 6.

In this way, by performing the first to the third processing as shown in the flowcharts as illustrated in FIG. 2 to FIG. 4, the K ink amount and the under color removal amount can be fairly controlled, so that the graininess in the area where lightness is high is controlled, a color reproducible range is utilized at the maximum and a gradation reproducibility can be enhanced.

Second Embodiment

The preparation method of a color conversion LUT (look-up table) for converting a device RGB into an output ink corresponding color signal in a multi-color printing apparatus using a CMYK dark ink and a diluted light ink at least for one color as an output ink will be described.

The preparation of the color conversion LUT will be performed by the following procedure.

First, an arbitrary lattice point for outputting a LUT lattice point, W (paper white), RGBCMY and a processing black Bk in the vertex of a reproducible color space of a color printing apparatus is decided, and an output constitutional ink color in each lattice point is decided.

Next, the constitutional ink color of each LUT lattice point in W (paper white)-RGBCMY and RGBCMY-Bk lines is decided.

From the above two procedures, the most outer contour of the reproducible output color space of the color printing apparatus is decided.

The constitutional ink color in each LUT lattice point in the W (paper white)-Bk line is decided.

By using the constitutional ink color of the arbitrary LUT lattice point column in the most outer contour and the constitutional ink color of the lattice point column in the W (paper white)-Bk line, an interpolation processing is performed, and an output of the arbitrary LUT internal lattice point is decided.

In the present embodiment, the K ink amount and the under color removal amount are controlled, so that the following effects can be obtained.

(1) Graininess is not produced in high lightness area.

(2) Color reproducible range of the color printing apparatus is utilized as much as possible.

(3) Continuity of a gradation is maintained.

A method for preparing a lattice point data of the color conversion LUT by controlling the K ink amount and the under color removal amount, that is, a method for deciding the constitutional ink color of each LUT lattice point in the RGBCMY—Bk line will be described below. It is particularly important to decide the constitutional ink in the lattice point on the line which links R, G, B, C, M, Y and K.

Figure 9:
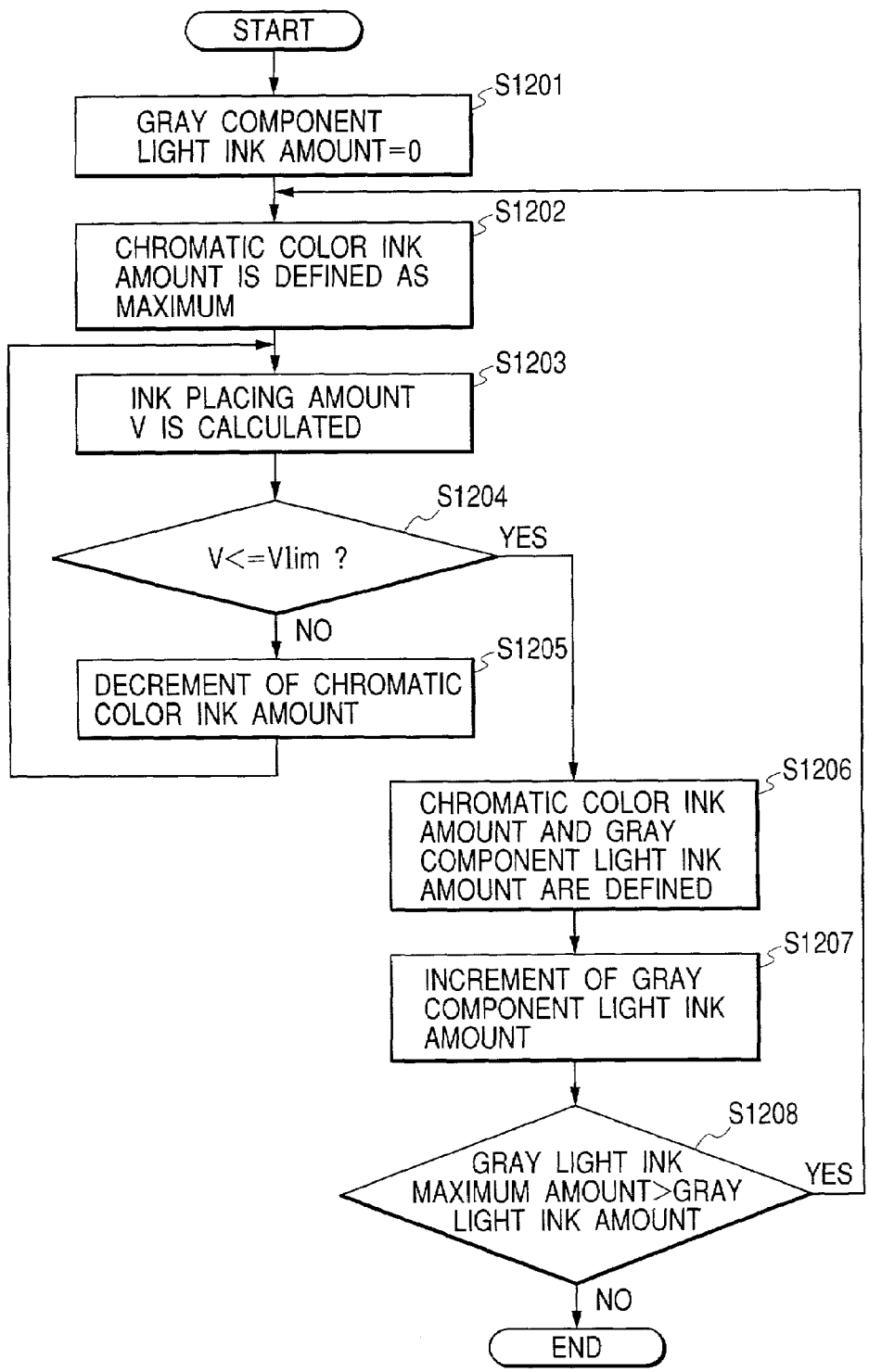
FIG. 9 is a flowchart illustrating a flow of the first processing in a second embodiment.
Figure 10:
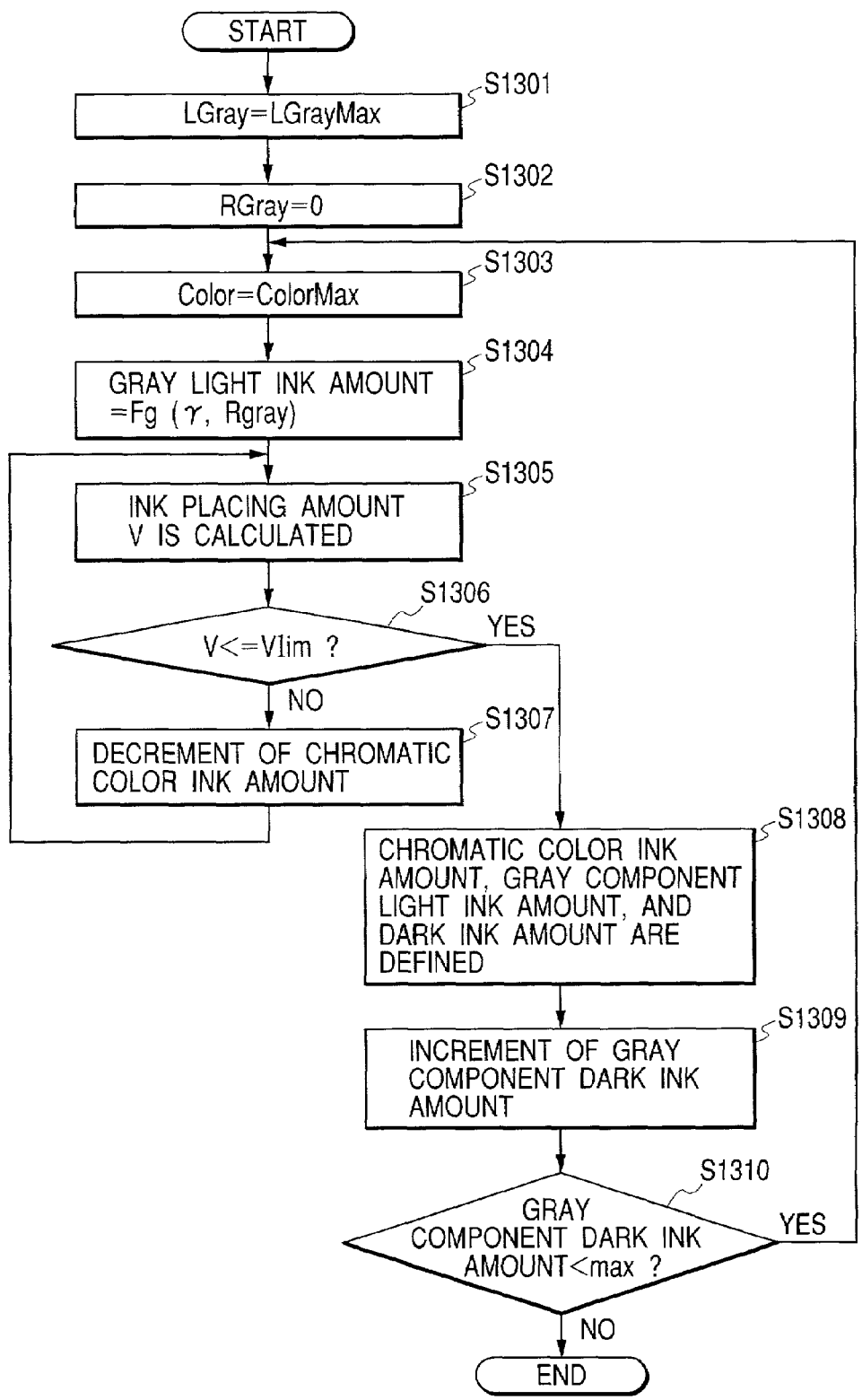
FIG. 10 is a flowchart illustrating the flow of the second processing in the second embodiment.
Figure 11:
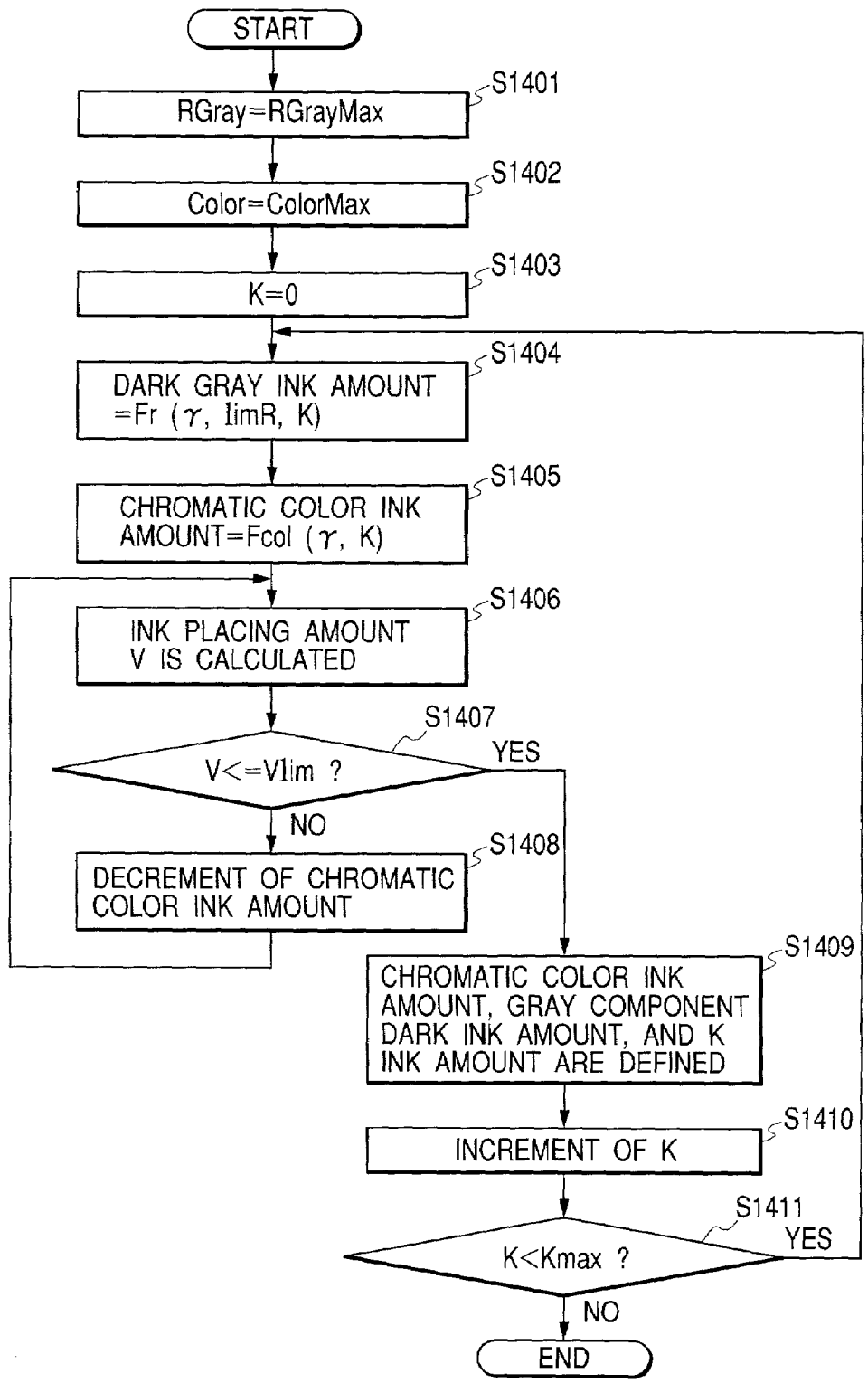
FIG. 11 is a flowchart illustrating the flow of the third processing in the second embodiment.

As a representative example, the decision of the constitutional ink in the output LUT lattice point column from R (red) to a process black will be described below with reference to the flowcharts as shown in FIG. 9, FIG. 10, FIG. 11. Note that the decision of the constitutional ink amount from each color of the GBCMY to the process black can be decided by the similar procedure.

A group of lattice points on a chromatic color-non-chromatic color line linking R (red) and Bk (process black) as shown in FIG. 1 is defined as a processing object lattice point column.

Based on the constitution of each dark and light ink constitution of the CMYK, each LUT lattice point column linking R-Bk is divided into the area (the area 0, FIG. 15) defined by the chromatic color ink and the complementary light ink amount, the area (the Area 1) defined the chromatic color ink and the complementary dark and light ink amount, the area (the Area 2) defined by the chromatic color ink and the complementary color dark ink amount, the area (the Area 3) defined by the chromatic color ink and the complementary dark ink amount and the K ink and the area (the Area 4) defined by the chromatic color ink and the K ink (the complementary dark ink amount=0).

(First Processing)

A CMYK ink amount deciding method in the area defined by the chromatic color ink and the complementary color light ink amount will be described with reference to the flowchart as shown in FIG. 9.

Attention is given to the graininess attributable to the K ink dot, and the maximum complementary color dark ink amount which becomes visually indistinguishable, a total ink placing amount limit condition Vlim in the color printing apparatus and the chromatic color ink amount which satisfies the total ink placing amount limit condition are defined in advance.

Further, regarding each chromatic color ink of the CMYRGB, attention is given to the graininess attributable to the complementary color dark ink dot at the start of input of the complementary color dark ink, and the maximum complementary color light ink amount in which this graininess becomes visually indistinguishable and the chromatic color ink amount which satisfies the total ink placing amount limit condition in the color printing apparatus shall be defined in advance.

For the chromatic color R ink which is constituted by an arbitrary Y dark ink amount and M dark ink amount, a light cyan ink amount CI which is a complementary light ink amount is defined.

In the above described lines, the complementary color ink amount is smaller than the chromatic color ink amount. Therefore, the complementary color ink amount denotes a gray component. Therefore, in the present embodiment, the complementary color ink amount is referred to as a gray component ink amount.

The maximum value Rm of the chromatic color R ink amount realizes R which is a vertex point color in the LUT.

In step 1201, the light cyan ink amount is defined as CI=0.

In step 1202, the chromatic color R ink amount Rg is defined as the maximum value Rm of the chromatic color R ink amount.

In step 1203, the light cyan ink amount CI and an ink placing amount V in the chromatic color R ink amount Rg are calculated.

In step 1204, the ink placing amount V in step 1203 is compared with the total ink placing amount limit condition Vlim in the color printing apparatus.

When the condition is satisfied, in step 1206, an ink combination of the chromatic color R ink amount Rg in the light cyan ink amount CI is maintained.

In step 1207, the light cyan ink amount CI is incremented.

In step 1208, until it is determined that the light cyan ink amount CI becomes the maximum complementary color light ink amount CIm, the processing subsequent to step 1202 is repeated.

In step 1204, when the condition is not satisfied, in step 1205, the chromatic color R ink amount Rg is reduced until the condition is satisfied.

Figure 13:
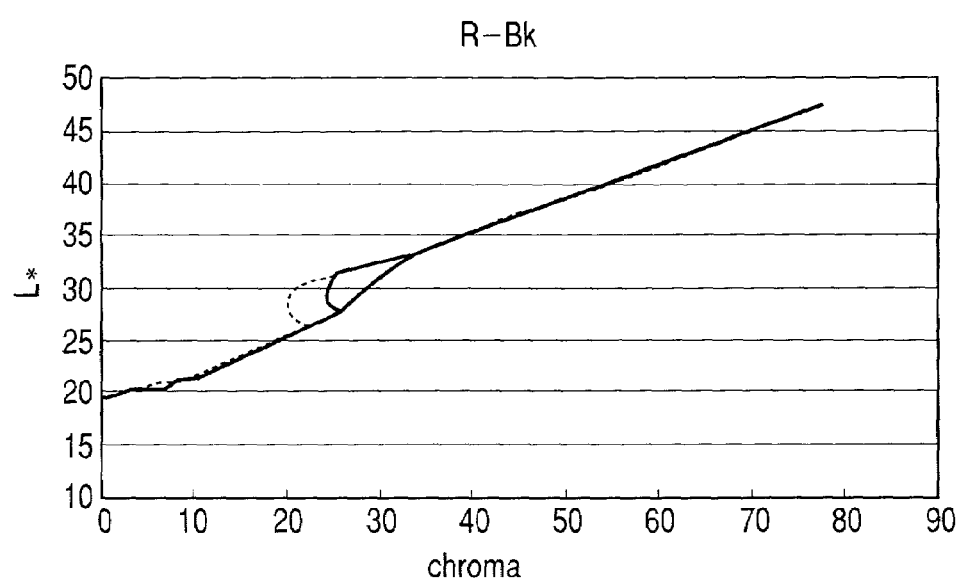
FIG. 13 is a diagram illustrating examples of the results of the first and the second processing.

The resultant example of the flowchart processing as illustrated in FIG. 9 becomes like the Area 0 of a graph as shown in FIG. 13.

(Second Processing)

A CMYK ink amount deciding method in the areas (the area 1, the area 2, FIG. 15) defined by the chromatic color ink and the complementary color dark and light ink amount will be described with reference to the flowchart as shown in FIG. 10.

For the chromatic color R ink constituted by an arbitrary Y dark ink amount and M dark ink amount, the cyan ink amount Cr which is the complementary dark ink amount and the cyan ink amount CI which is the complementary light ink amount are defined.

In step 1301, the complementary light cyan ink amount is defined as CI=CIm.

In step 1302, the complementary dark ink amount is defined as Cr=0.

In step 1303, the chromatic color R ink amount Rg is defined as the maximum value Rm of the chromatic color R ink amount.

Subsequently, the complementary dark ink amount is linearly increased until it reaches the complementary dark ink amount maximum value Crm.

While the complementary color light cyan ink amount CI is defined by the maximum value CIlim of the complementary cyan ink amount and a γl parameter, a zero value (an end) in the complementary ink is defined by an arbitrary parameter Iimit L for the complementary color dark ink amount. Therefore, the complementary color light cyan ink amount Cl is defined by the following equation.

$$CI = CIlim \cdot (1 - Fli(Cr, \gamma l, limitL)) \quad (13.1)$$

In step 1304, the light cyan ink amount CI is defined by the above described equation (13.1).

In step 1305, the ink placing amount V in the light cyan ink amount CI, the dark cyan ink amount Cr and the chromatic color R ink amount Rg is calculated.

In step 1306, the ink placing amount V in step 1305 is compared with the total ink placing amount limit condition Vlim in the color printing apparatus.

When the condition is satisfied, in step 1308, the ink combination of the light cyan ink amount CI, the dark cyan ink amount Cr and the chromatic color R ink amount Rg is maintained.

In step 1309, the dark cyan ink amount Cr is incremented.

In step 1310, until it is determined that the dark cyan ink amount Cr becomes the maximum dark cyan ink amount Crm, the processing subsequent to step 1303 is repeated.

In step 1306, when the condition is not satisfied, in step 1307, the chromatic color R ink amount Rg is reduced until it satisfies the condition.

The resultant examples in the flowchart processing as shown in FIG. 10 become like the Area 1, the Area 2 of the graph as shown in FIG. 13.

(Third Processing)

A CMYK dark and light ink amount deciding method in the area defined by the chromatic color ink, the complementary color dark ink amount and the K ink and the area defined by the chromatic color ink and the K ink (the complementary dark ink amount=0) will be described with reference to the flowchart of FIG. 11.

In step 1401, the complementary color dark cyan ink amount is defined as Cr=Crm.

In step 1402, the chromatic color R ink amount Rk is defined as the maximum value Rm of the chromatic color R ink amount.

In step 1403, the K ink amount is defined as k=0.

Subsequently, the K ink is linearly increased to the K ink maximum value.

On the other hand, the chromatic color R ink amount Rk is defined by the following equation having the maximum value Rm of the chromatic color R ink amount, the K ink amount K and the γr parameter.

$$Rk = Rm \cdot (1 - (K/255)\gamma r) \quad (14.1)$$

The complementary color dark cyan ink amount Cr is defined by the following equation having the maximum value Crm of the complementary color cyan ink amount, a γc parameter and a parameter limit R showing the zero value (the end) of the complementary color ink.

$$Cr = Crm \cdot (1 - Fr(K, \gamma c, limitR)) \quad (14.2)$$

In step 1404, the dark cyan ink amount Cr is defined by the K ink amount K and the above described equation (14.2).

In step 1405, the chromatic color R ink amount Rk is defined by the above described equation (14.1).

In step 1406, the ink placing amount V is calculated by the K ink amount K, the dark cyan ink amount Cr and the chromatic color R ink amount Rk.

In step 1407, the ink placing amount V in step 1404 is compared with the CMYK total ink placing amount limit condition Vlim in the color printing apparatus.

When the condition is satisfied, in step 1409, the ink combination of the chromatic color R ink amount Rk in the K ink amount K and the cyan ink amount Cr is maintained.

In step 1410, the K ink amount K is incremented.

In step 1411, until it is determined that the K ink amount K becomes the maximum K ink amount, the processing subsequent to step 1404 is repeated.

In step 1407, when the condition is not satisfied, in step 1408, the chromatic color R ink amount Rk is decreased until it satisfies the condition.

The resultant examples in the flowchart as shown in FIG. 11 become like the Area 3 and the Area 4 as illustrated in the graph shown in FIG. 13.

From the ink amount combination calculated by the flowchart processing of FIG. 9 to FIG. 11, which have defined each dark and light ink amount of the CMYK, the ink combination of the arbitrary point number is selected, so that the batch in the ink combination of the above described selected ink combination by the color printing apparatus is outputted and color-measured.

Figure 15:
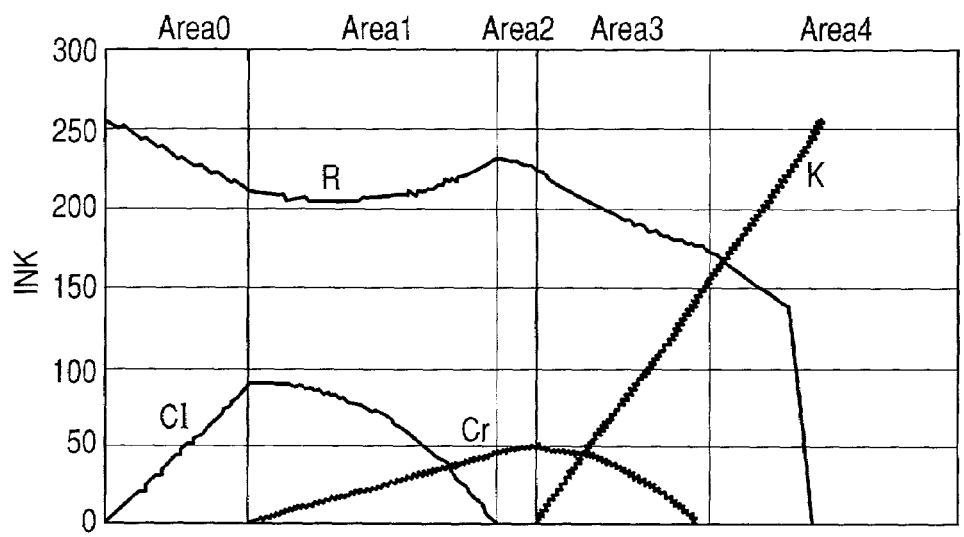
FIG. 15 is a diagram illustrating the comparison result regarding the reproduction color space in the color printing apparatus shown by the axis of the ordinates L*, the axis of abscissas chroma (chromaticness) when the parameter for finding the complementary color ink and the chromatic color ink is changed in the second embodiment.
Figure 16:
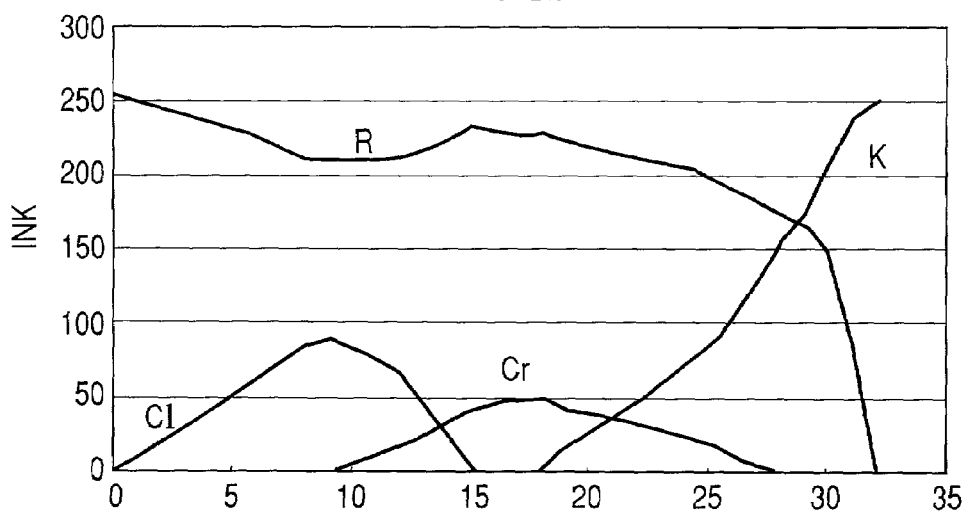
FIG. 16 is a diagram illustrating the comparison result regarding the reproduction color space in the color printing apparatus shown by the axis of the ordinates b*, the axis of abscissas a* when the parameter for finding the complementary color ink and the chromatic color ink is changed in the second embodiment.

The resultant examples are shown in FIG. 15, FIG. 16.

In FIG. 15, FIG. 16, regarding the light cyan ink amount Cl and the dark cyan ink amount Cr to be defined by the above described equation (13.1) and the above described equation (14.2), the result of the change made in three types of each parameter in the above described equation (13.1), the above described equation (14.1) and the above described equation (14.2) is shown.

Therefore, as evident from FIG. 15, FIG. 16, regarding the area defined by the chromatic color ink and the complementary color light ink amount, the area defined by the chromatic color ink and the complementary color dark and light ink amount, the area defined by the chromatic color ink and the complementary color dark ink amount, the area defined by the chromatic color ink and the complementary color dark ink amount and the K ink and the area defined by the chromatic color ink and the K ink (the complementary color ink amount=0), the reproducible color space is the maximum and each parameter for smoothly linking each area in the above descried equation (13.1), the above described equation (14.1) and the above described equation (14.2) can be concentratedly decided.

Therefore, each parameter, where the reproducible color space is the maximum and the gradation is high, for smoothly linking each area in the above described equation (13.1), the above described equation (14.1), the above described equation (14.2) can be decided.

(Fourth Processing)

In each dark and light ink amount of the CMYK in each decided parameter, regarding the ink combination of the selected arbitrary point number, by forming and color-measuring the batch, each three dimensional coordinate value in the color reproducible space is calculated.

Figure 12:
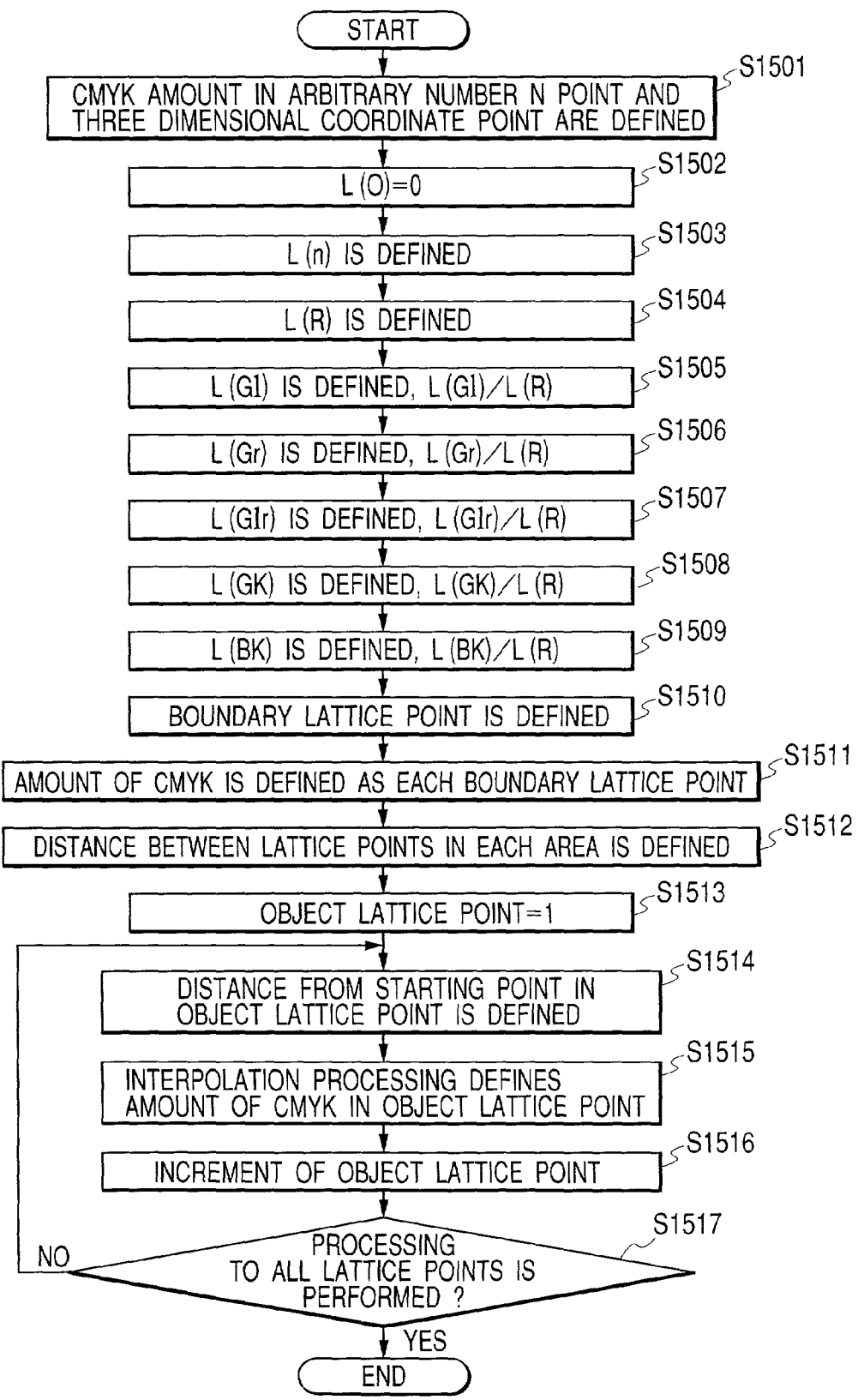
FIG. 12 is a flowchart illustrating the flow of the fourth processing in the second embodiment.

A processing for defining each dark and light ink amount of the CMYK in the LUT lattice point based on the each dark and light ink amount of the CMYK in each parameter decided by the above described procedure will be described with reference to the flowchart shown in FIG. 12.

In step 1501, regarding the arbitrary number N point on R-Bk in the color conversion LUT, the three-dimensional coordinate value in each ink amount of the CMYK and the color reproducible space is defined. On this occasion, each dark and light ink amount of the CMYK in the boundaries of the Area 0, the Area 1, the Area 2, the Area 3 and the Area 4 is included in N point.

In step 1502, a Bk point is taken as a starting point 0 and a three dimensional distance L is defined as L(0)=0.

In step 1503, for the above described arbitrary number of points n, the three dimensional distances L from adjacent points (n−1) are calculated respectively.

When the three dimensional space is a Lab space, it can be calculated by the following equation.

$$L(n) = \sqrt{(L^*(n)-L^*(n-1))^2+(a^*(n)-a^*(n-1))^2+(b^*(n)-b^*(n-1))^2}$$

In step 1504, the Bk point is taken as the starting point, and the distance L (R) to R is calculated as a total sum of the three dimensional distances between respective points calculated in step 1503.

$$L(R)=\Sigma L(n) \ (n=0 \ldots N)$$

In step 1505, from each three dimensional coordinate value in the color reproducible space, the distance L(GI) of the area 0 is calculated, and a ratio for the distance L(R) is calculated.

In step 1506, the distance L(GIr) of the Area 1 is calculated, and a ratio for the distance L(R) is calculated.

In step 1507, the distance L(Gr) of the Area 2 is calculated, and a ratio for the distance L(R) is calculated.

In step 1508, the distance L(GK) of the Area 3 is calculated, and a ratio for the distance L(R) is calculated.

In step 1509, the distance L(BK) of the Area 4 is calculated, and a ratio for the distance L(R) is calculated.

In step 1510, according to a ratio of the distance of each area and the distance L(R), the LUT lattice point number reproducing each area distance is distributed.

In step 1511, for the LUT lattice point which becomes the boundary of each area, the CMYK dark and light ink amount which becomes the boundary of each area is defined.

In step 1512, the distances L(GI), L(GIr), L(Gr). L(GK) and L(BK) which are defined as the distances between each area are equally divided by the distributed lattice point number and the distance between the LUT lattice point between each area is calculated.

In step 1513, in the R-Bk lattice point column, with Bk as a starting point, the object LUT lattice point is defined as a lattice point shifted from the BkLUT lattice point to the R side by one lattice point.

In step 1514, the distance between the lattice points from the starting point Bk in the object LUT lattice point is obtained from the distance between the LUT lattice points in each area obtained in step 1512.

In step 1515, based on the combination of each dark and light ink amount of the CMYK which holds the distance between each lattice points from the starting point Bk in the defined object LUT lattice point and each distance from the starting point Bk defined in step 1515, each dark and light ink amount of the CMYK in the object LUT lattice point is calculated from a linear interpolation processing based on the distance.

In step 1516, the object lattice point is shifted to the R side by one lattice point.

In step 1517, in all the lattice points in the R-Bk lattice point column, until each dark and light ink amount of the CMYK is defined, the processing from step 1514 to step 1517 is repeated.

As described above, by performing the processing by the flowchart as shown in FIG. 9 to FIG. 12, regarding the defined LUT lattice point column, the output reproducible color space of the color printing apparatus becomes as maximum as possible, and the preparation of the color conversion look-up table for realizing a good gradation reproducible image output is realized.

Figure 14:
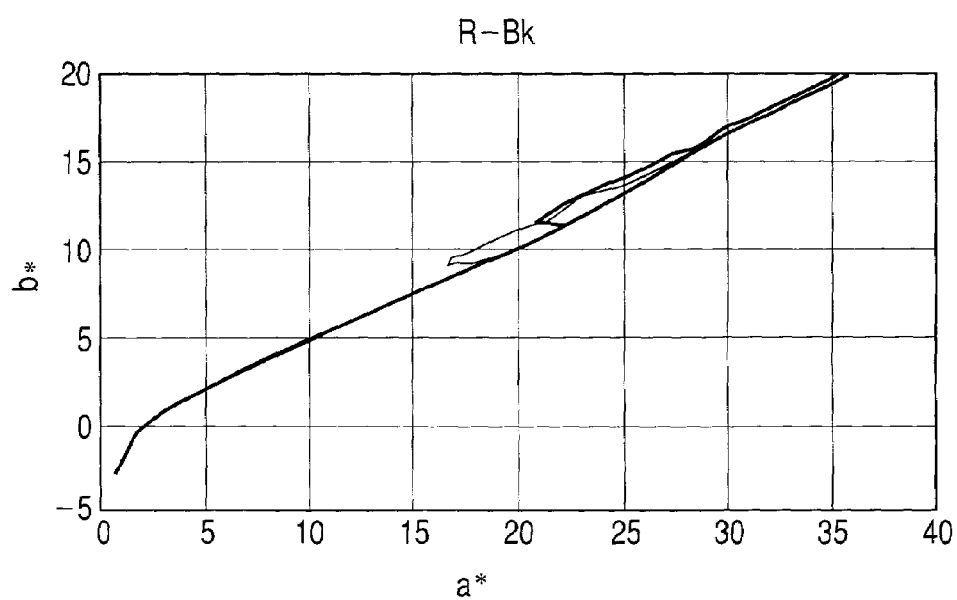
FIG. 14 is a diagram illustrating the example of the result of the third processing in the second embodiment.

The resultant examples of the processing by the flowchart as shown from FIG. 9 to FIG. 12 are shown in FIG. 14.

According to the present embodiment, by the first processing, no graininess can be produced in the high lightness area. Further, by the first to the third processing, the color reproducible range of the color printing apparatus can be utilized to the full. Also, by the first to the fourth processing, a continuity of the color can be maintained.

Third Embodiment

It is evident that the above described each embodiment can adapt the present invention not only in the preparation of the color conversion look-up table used in the interior of the color printing apparatus, but also in the preparation of the look-up table used in the color conversion in a host computer in the system such as transmitting an image output result treated with a color conversion processing to the color printing apparatus in the interior of the host computer connected to the color printing apparatus.

To the computer inside the apparatus or the system connected to the various devices so that the various devices can be operated to realize the functions of the above described embodiment, the program code of a software for realizing the above described embodiment functions are provided, and those functions practiced by operating the above described various devices according to the program stored in the computer (CPU or MPU) of the system or the apparatus are also included in the category of the present invention.

In this case, the program code itself of the above described software realizes the above described functions of the embodiment, and the program code itself and means for providing the program code to the computer, for example, a storage medium which has stored such a program constitute the present invention.

As the storage medium storing such a program code, for example, a floppy disk, a hard disk, an optical disk, an optical magnetic disk, CD-ROM, a magnetic tape, a non-volatile memory card, ROM and the like can be used.

Needless to mention, by practicing the provided program code by the computer, not only the above described functions of the embodiment can be realized, but also such a program code is included in the embodiments of the present invention even when the above described functions of the embodiment in collaboration with an OS (an operation system), in which the program code is operated, or another application soft and the like are realized.

Needless to mention, after the provided program code is stored in a function expansion board of the computer or a memory provided in a function expansion unit of the computer, in the case where a CPU and the like provided in the function expansion board or the function storage unit perform a part or the whole of an actual processing based on the instruction of the program code, and the above described functions of the embodiment are realized by the processing, such a case is also included in the present invention.

While the present invention has been described with respect to what is presently considered to be the preferred embodiments, it is to be understood that the invention is not limited to the disclosed embodiments. To the contrary, the present invention is intended to cover the various modifications and equivalent arrangements included within the spirit and scope of the appended claims.

What is claimed is:

1. An image processing method for determining a starting point which produces a black component between vertices showing a plurality of chromatic colors and a vertex showing a black in a reproducible color space of a color output apparatus, an amount of the black component between the starting point and the vertex showing the black and an amount of a complementary color component, when a look-up table for converting an input color signal into a plurality of color components including a black component is prepared, said method comprising the steps of:

determining the starting point which produces the black component based on the value of the complementary color component corresponding to the chromatic color which is inconspicuous in a graininess of a black recording material in an output image;

determining the amount of the black component between the starting point and the vertex showing the black by linearly increasing the black component from the starting point to the vertex showing the black, independently of the complementary color component corresponding to the chromatic color; and determining the amount of the complementary color component based on the determined amount of the black component.

2. The image processing method according to claim 1, wherein, in each line linking each vertex showing the plurality of chromatic colors and the vertex showing the black on the color space, the starting point independently producing the black component and the amount of the black component are determined.

3. The image processing method according to claim 1, wherein, from said black component starting point to the vertex showing said black, the chromatic color component and the complementary color component and the black component are calculated by using a function.

4. An image processing method for preparing a look-up table for converting an input color signal into an output color signal constituted by a plurality of color components which are used when a color output apparatus outputs a color image, wherein the method is intended for setting up a lattice point between a vertex showing the chromatic color and a vertex showing the black in a reproducible color space of said color output apparatus, and wherein, in accordance with the method:

an interval between the vertex showing the chromatic color and the vertex showing the black is divided into a plurality of areas different in the combination of a color component used in a color reproduction, and a lattice point is set up according to a ratio of each area between the vertex showing the chromatic color and the vertex showing the black.

5. A program for realizing an image processing method for determining a starting point which produces a black component between vertices showing a plurality of chromatic colors and a vertex showing a black in a reproducible color space of a color output apparatus, an amount of the black component between the starting point and the vertex showing the black and an amount of a complementary color component, when a look-up table for converting an input color signal into a plurality of color components including a black component is prepared, said method realized by said program comprising the steps of:

determining the starting point which produces the black component based on the value of the complementary color component corresponding to the chromatic color which is inconspicuous in a graininess of a black recording material in an output image;

determining the amount of the black component between the starting point and the vertex showing the black by linearly increasing the black component from the starting point to the vertex showing the black, independently of the complementary color component corresponding to the chromatic color; and determining the amount of the complementary color component based on the determined amount of the black component.

6. A program for realizing an image processing method for preparing a look-up table for converting an input color signal into an output color signal constituted by a plurality of color components which are used when a color output apparatus outputs a color image, wherein the method realized by the program is intended for setting up a lattice point between a vertex showing the chromatic color and a vertex showing a black in a reproducible color space of the color output apparatus, and wherein, in accordance with the method realized by the program:

an interval between the vertex showing the chromatic color and the vertex showing the black is divided into a plurality of areas different in the combination of the color component used in a color reproduction, and a lattice point is set up according to a ratio of each area between the vertex showing the chromatic color and the vertex showing the black.

7. An image processing method for determining a starting point which produces a dark color component between vertices showing a plurality of chromatic colors and a vertex showing a black in a reproducible color space of a color output apparatus, an amount of the dark color component concerning a complementary color component corresponding to a chromatic color between the staring point and the vertex showing the black and an amount of a light color component concerning the complementary color component corresponding to the chromatic color, when a look-up table for converting an input color signal into a black component and a plurality of color components of different densities to be used in identical system color reproduction, said method comprising the steps of:

determining the starting point which produces the dark color component based on the value of the light color component concerning the complementary color component which is inconspicious in a graininess of a dark color recording material concerning the complementary color component corresponding to the chromatic color in an output image;

determining the amount of the dark color component between the starting point and the vertex showing the black by linearly increasing the dark color component from the starting point to the maximum value of the dark color component, independently of the light color component; and determining the amount of the light color component based on the determined amount of the dark color component.

8. The image processing method according to claim 7, wherein the starting point producing the black component is controlled based on the value of the color component corresponding to the dark recording material concerning the complementary color component which is inconspicuous in the graininess of the black recording material in the output image.

9. The image processing method according to claim 7, wherein the starting point independently producing the black component is controlled in respective lines linking respective vertices showing the plurality of chromatic colors and the vertex showing the black.

10. A recording medium recording a program for realizing an image processing method for determining a starting point which produces a dark color component between vertices showing a plurality of chromatic colors and a vertex showing a black in a reproducible color space of a color output apparatus, an amount of the dark color component concerning a complementary color component corresponding to a chromatic color between the starting point and the vertex showing the black and an amount of a light color component concerning the complementary color component corresponding to the chromatic color, when a look-up table for converting an input color signal into a black component and a plurality of color components of different densities to be used in identical system color reproduction, the method realized by the program recording on the recording medium comprising the steps of:

determining the starting point which produces the dark color component based on the value of the light color component concerning the complementary color component which is inconspicuous in a graininess of a dark color recording material concerning the complementary color component corresponding to the chromatic color in an output image;

determining the amount of the dark color component between the starting point and the vertex showing the black by linearly increasing the dark color component from the starting point to the maximum value of the dark color component, independently of the light color component; and determining the amount of the light color component based on the determined amount of the dark color component.

* * * * *

UNITED STATES PATENT AND TRADEMARK OFFICE
CERTIFICATE OF CORRECTION

PATENT NO. : 6,995,881 B2　　　　　　　　　　　　　　　　　　　　　　Page 1 of 1
APPLICATION NO. : 09/901612
DATED : February 7, 2006
INVENTOR(S) : Yoshiko Iida et al.

It is certified that error appears in the above-identified patent and that said Letters Patent is hereby corrected as shown below:

COLUMN 7

Line 46, "R Bk" should read --R-Bk--.

COLUMN 14

Line 57, "program" should read --program implemented in a computer readable medium--.

COLUMN 15

Line 15, "program" should read --program implemented in a computer readable medium--.

Signed and Sealed this

Twenty-second Day of August, 2006

JON W. DUDAS
*Director of the United States Patent and Trademark Office*